United States Patent
Wu (10) Patent No.: US 10,671,036 B2
(45) Date of Patent: Jun. 2, 2020

(54) CONTROL METHOD, ELECTRONIC DEVICE, AND ELECTRONIC APPARATUS

(71) Applicant: Lenovo (Beijing) Limited, Beijing (CN)

(72) Inventor: Meng Wu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 677 days.

(21) Appl. No.: 15/392,808

(22) Filed: Dec. 28, 2016

(65) Prior Publication Data

US 2017/0191687 A1    Jul. 6, 2017

(30) Foreign Application Priority Data

Dec. 31, 2015    (CN) .......................... 2015 1 1032594

(51) Int. Cl.
| | |
|---|---|
| *G05B 19/042* | (2006.01) |
| *F24F 11/62* | (2018.01) |
| *F24F 11/30* | (2018.01) |
| *F24F 110/20* | (2018.01) |
| *F24F 110/50* | (2018.01) |
| *F24F 11/63* | (2018.01) |
| *F24F 110/10* | (2018.01) |
| *G06Q 50/06* | (2012.01) |

(52) U.S. Cl.
CPC ............ *G05B 19/042* (2013.01); *F24F 11/30* (2018.01); *F24F 11/62* (2018.01); *F24F 11/63* (2018.01); *F24F 2110/10* (2018.01); *F24F 2110/20* (2018.01); *F24F 2110/50* (2018.01); *G05B 19/0426* (2013.01); *G05B 2219/2614* (2013.01); *G06Q 50/06* (2013.01)

(58) Field of Classification Search
CPC .......... G05B 19/042; F24F 11/62; F24F 11/30
See application file for complete search history.

(56) References Cited

U.S. PATENT DOCUMENTS

| | | | |
|---|---|---|---|
| 6,208,905 B1 | 3/2001 | Giddings et al. | |
| 8,630,741 B1* | 1/2014 | Matsuoka | H04L 12/2829 700/276 |
| 2010/0025483 A1 | 2/2010 | Hoeynck et al. | |

(Continued)

FOREIGN PATENT DOCUMENTS

| | | |
|---|---|---|
| CN | 101614433 A | 12/2009 |
| CN | 104266312 A | 1/2015 |
| CN | 104613597 A | 5/2015 |

*Primary Examiner* — Ronald D Hartman, Jr.
(74) *Attorney, Agent, or Firm* — Kunzler Bean & Adamson (57) ABSTRACT

A method is disclosed. The method may include executing, on a first device, a first instruction for adjusting a first environmental parameter of a first space from a first parameter value to a second parameter value. The method may include determining an influencing parameter. The influencing parameter may influence a change in the first environmental parameter of the first space. The method may include executing a second instruction based on at least one of the influencing parameter, the first parameter value, and the second parameter value. A second energy consumption of the first device, in response to execution of the second instruction, may be lower than a first energy consumption of the first device in response to execution of the first instruction. An electronic device and program product are also disclosed.

20 Claims, 2 Drawing Sheets

(56) References Cited

U.S. PATENT DOCUMENTS

| | | | |
|---|---|---|---|
| 2011/0066302 A1* | 3/2011 | McEwan | E06B 9/32 |
| | | | 700/295 |
| 2012/0143356 A1* | 6/2012 | Berg-Sonne | G05B 15/02 |
| | | | 700/49 |
| 2015/0045966 A1* | 2/2015 | Chen | G05B 13/042 |
| | | | 700/277 |
| 2017/0173262 A1* | 6/2017 | Veltz | A61M 5/1723 |
| 2017/0205105 A1* | 7/2017 | Adam | F24F 11/30 |
| 2018/0132336 A1* | 5/2018 | Chraibi | H05B 37/0227 |
| 2018/0177030 A1* | 6/2018 | Abelard | G05B 13/0265 |
| 2019/0124745 A1* | 4/2019 | Mason | H05B 37/029 |
| 2019/0222931 A1* | 7/2019 | Kriegel | H04R 3/04 |

\* cited by examiner

CONTROL METHOD, ELECTRONIC DEVICE, AND ELECTRONIC APPARATUS

FIELD

The subject matter disclosed herein relates to the field of electronic technologies, and in particular to a control method, an electronic device, and an electronic apparatus.

BACKGROUND

Environmental control devices, such as air conditioners, air purifiers, and fan heaters, have become increasingly popular. However, the operation of an environmental control device may be influenced by other factors during use. The influencing factors may cause the environmental control device to expend more or less energy than normal to achieve an environmental control target.

SUMMARY

One embodiment of the present disclosure discloses a method. The method may include executing, on a first device, a first instruction for adjusting a first environmental parameter of a first space from a first parameter value to a second parameter value. The method may include determining an influencing parameter. The influencing parameter may influence a change in the first environmental parameter of the first space. The method may include executing a second instruction based on at least one of the influencing parameter, the first parameter value, and the second parameter value. A second energy consumption of the first device, in response to execution of the second instruction, may be lower than a first energy consumption of the first device in response to execution of the first instruction.

In one embodiment, the first environmental parameter may include an illumination level, a temperature, an air quality, or a humidity level. In some embodiments, the influencing parameter may include a second environmental parameter of a second space or a device parameter of a first device. The second environmental parameter may influence a change in the first environmental parameter. The first device may control the second environmental parameter.

In one embodiment, executing the second instruction may include outputting prompting information. The prompting information may include one or more prompted instructions for reducing the first energy consumption. In response to executing at least one of the one or more prompting instructions, the second energy consumption may be lower than the first energy consumption. In one embodiment, executing the second instruction may include adjusting the device parameter of the first device, and generating one or more instructions that control a second device to adjust the device parameter. in one embodiment, in response to adjusting the device parameter, a parameter value of the second environmental parameter may change.

In some embodiments, adjusting the device parameter of the first device may include, in response to the first instruction adjusting the first parameter value to the second parameter value in a first direction and an influencing direction of a second influencing parameter influencing the first environmental parameter including the first direction, adjusting the device parameter of the first device to a first device parameter to cause the second environmental parameter to influence the first environmental parameter. The method may include, in response to the first instruction adjusting the first parameter value to the second parameter value in the first direction and the influencing direction of the second influencing parameter influencing the first environmental parameter including a different direction from the first direction, adjusting the device parameter of the first device to a second device parameter to reduce the influence of the second environmental parameter on the first environmental parameter.

In one embodiment, generating one or more instructions that control the second electronic device different from the first electronic device to adjust the device parameter may include generating one or more instructions that may adjust the second electronic device to a third device parameter in response to the first instruction adjusting the first parameter value to the second parameter value in a second direction. An adjusting direction of the parameter value of the first environmental parameter may include the second direction. In one embodiment, executing the second instruction may include executing a power-reduction instruction that operates the first electronic device in a low power consumption state.

In one embodiment, an electronic device is disclosed. The electronic device may include a receiver. The receiver may execute a first instruction that may adjust a first environmental parameter of a first space from a first parameter value to a second parameter value. In one embodiment, the electronic device may include a processor. The processor may determine an influencing parameter. The influencing parameter may influence a change in the first environmental parameter of the first space. The processor may execute a second instruction based on the influencing parameter, the first parameter value, and the second parameter value. A second energy consumption in response to the execution of the second instruction may be lower than a first energy consumption in response to the execution of the first instruction.

In one embodiment, the first environmental parameter may include an illumination level, a temperature, an air quality, or a humidity. In some embodiments, the influencing parameter may include a second environmental parameter of a second space or a device parameter of a first device. The second environmental parameter may influence a change in the first environmental parameter, and the first device may control the second environmental parameter.

In one embodiment, the electronic device may further include an outputter. The outputter may output prompting information. The prompting information may include one or more prompted instructions for reducing the first energy consumption. The second energy consumption may be lower than the first energy consumption in response to the processor executing at least one of the one or more prompting instructions.

In one embodiment, the processor executing the second instruction may include adjusting the device parameter of the first device, or generating one or more instructions that control a second device to adjust the device parameter. In response to adjusting the device parameter, a parameter value of the second environmental parameter may change. In one embodiment, the processor adjusting the device parameter of the first device may include, in response to the first instruction adjusting the first parameter value to the second parameter value in a first direction and an influencing direction of a second influencing parameter influencing the first environmental parameter including the first direction, the processor may adjust the device parameter of the first device to a first device parameter to cause the second environmental parameter to influence the first environmental parameter. In one embodiment, the processor adjusting the device parameter of the first device may include, in response to the first instruction adjusting the first parameter value to the second parameter value in the first direction and the influencing direction of the second influencing parameter influencing the first environmental parameter including a different direction from the first direction, the processor may adjust the device parameter of the first device to a second device parameter to reduce the influence of the second environmental parameter on the first environmental parameter.

In some embodiments, the processor generating one or more instructions that control the second electronic device different from the first electronic device to adjust the device parameter may include the processor generating one or more instructions that may adjust the second electronic device to a third device parameter in response to the first instruction adjusting the first parameter value to the second parameter value in a second direction. An adjusting direction of the parameter value of the first environmental parameter may include the second direction. In one embodiment, the processor executing the second instruction may include the processor executing a power-reduction instruction that may operates the first electronic device in a low power consumption state.

In one embodiment, the electronic device may include a first instruction acquisition unit. The first instruction acquisition unit may obtain the first instruction. The first instruction may adjust the first environmental parameter of the first space from the first parameter value to the second parameter value. The electronic device may include an influencing parameter acquisition unit. The influencing parameter acquisition unit may obtain the influencing parameter. The influencing parameter may changes the environmental parameter.

In one embodiment, the processor may execute the second instruction based on the influencing parameter, the first parameter value and the second parameter value. The second energy consumption is lower in response to the execution of the second instruction than the first energy consumption in response to the execution of the first instruction.

In one embodiment, a program product is disclosed. The program product may include a non-transitory computer readable storage medium that may store code executable by a processor. The executable code may include code to perform executing, on a first device, a first instruction for adjusting a first environmental parameter of a first space from a first parameter value to a second parameter value. The executable code may include code to perform determining an influencing parameter. The influencing parameter may influence a change in the first environmental parameter of the first space. The executable code may include code to perform executing a second instruction based on at least one of the influencing parameter, the first parameter value, and the second parameter value. A second energy consumption of the first device, in response to execution of the second instruction, may be lower than a first energy consumption of the first device in response to execution of the first instruction.

In one embodiment, the influencing parameter may include a second environmental parameter of a second space or a device parameter of a first device. The second environmental parameter may influence a change in the first environmental parameter, and the first device controls the second environmental parameter.

In one embodiment, the executable code to perform executing the second instruction may include code to perform outputting prompting information including one or more prompted instructions for reducing the first energy consumption. In response to executing at least one of the one or more prompting instructions, the second energy consumption may be lower than the first energy consumption.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

The present application provides a control method, an electronic device, and an electronic apparatus for reducing the influence of external factors regarding the power consumption of an environmental control device.

The present application describes various embodiments in detail below through the accompanying drawings. In should be understood that the embodiments of the present application and specific features in the embodiments may include detailed descriptions of some technical solutions in the present application, rather than limitations to the present application. The embodiments of the present application and technical features in the embodiments may be combined with each other without conflict.

The term or in this specification describes only an association relationship for describing associated objects and represents that three relationships may exist. For example, A or B may represent the following three cases: only A exists, both A and B exist, and only B exists. In addition, the symbol "/" in this specification generally indicates an "or" relationship between the associated objects.

Figure 1:
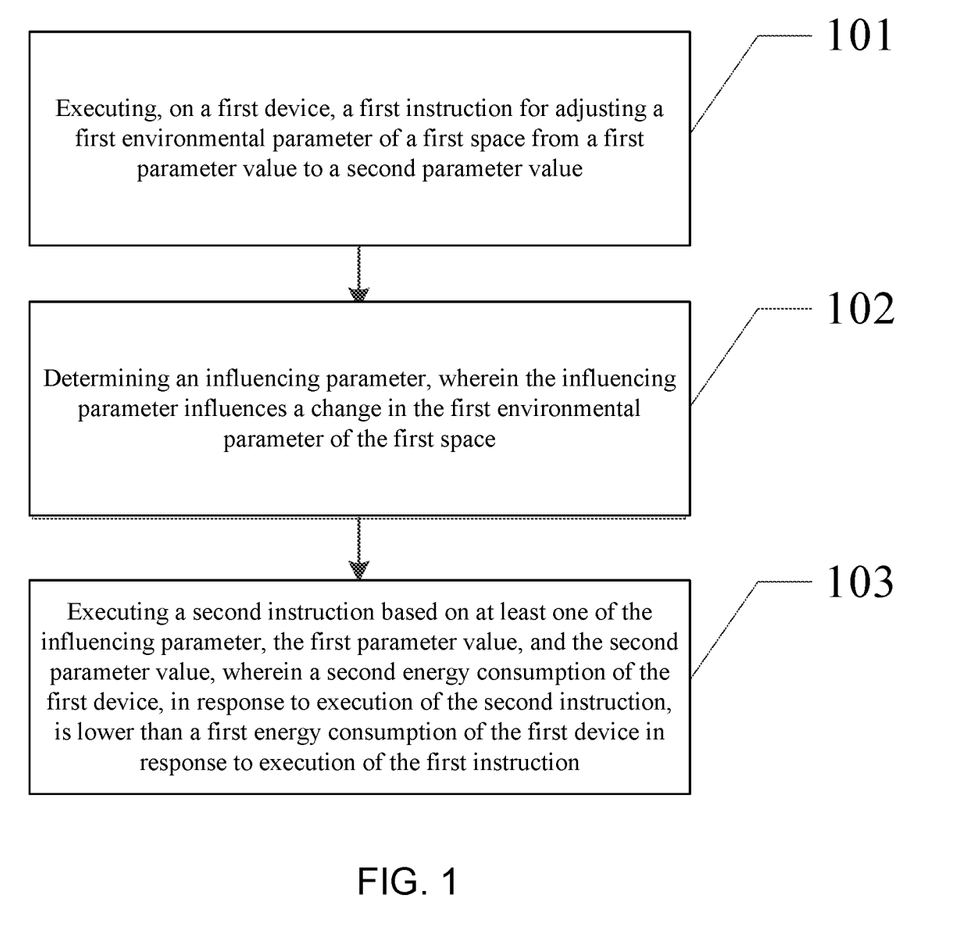
FIG. 1 is a flow diagram of a control method provided by an embodiment of the present disclosure.

FIG. 1 is a flowchart diagram depicting one embodiment of a control method. The method may include one or more of the following steps.

Step 101 includes executing a first instruction on a first electronic device. The first instruction may include an instruction that adjusts a first environmental parameter of a first space from a first parameter value to a second parameter value.

In one embodiment, an environmental parameter may include a characteristic of an environment, area, space, or the like. For example, an environmental parameter may include an illumination level (such as a light level, an ambient brightness, or the like), a temperature, an air quality, a humidity, or the like. In one embodiment, a space may include a physical area. The space may include an enclosed space or an open space. For example, in one embodiment, a space may include a room, a building, or the like. In one embodiment, a parameter value may include a value that may allow an environmental parameter to be measured. For example, in one embodiment, an environmental parameter may include a temperature and a parameter value of the environmental parameter may include 77 degrees Fahrenheit (approx. 25 degrees Celsius).

In some embodiments, the first instruction may include an instruction generated by a user's input to the first electronic device. For example, in one embodiment, the instruction may include an instruction input into an air conditioner by the user for adjusting the environmental temperature to 77 degrees Fahrenheit (approx. 25 degrees Celsius). In one embodiment, Step 101 may include obtaining the first instruction through an electronic device (for example, from user input, from another device, or the like).

In one embodiment, the first instruction may include an instruction automatically generated by the first electronic device through a preset procedure. For example, the instruction may include an instruction to adjust the ambient brightness of an electronic device (for example, the first electronic device). Adjusting the ambient brightness of the electronic device may adjust the ambient brightness of the space around the electronic device. The first electronic may detect a first level of ambient brightness from an illumination intensity in the current environment. The first electronic device may automatically generate a second level of ambient brightness from the first level of ambient brightness. The second level may include a level of brightness less or more illuminating than the first level luminance, or the like. The first instruction may include other instructions used for adjusting the environmental parameter.

Step 102 includes determining an influencing parameter. In some embodiments, the environmental parameter of the first space may be changeable by the influence of the influencing parameter.

In one embodiment, during operation of an environmental control device, an environmental parameter corresponding to one or more other spaces connected with first space may influence the environmental parameter of a the first space. For example, the first space may connect with a second space and the second space may include a temperature higher than the temperature of the first space. In response to the connection, the temperature of the second space may influence the temperature of the first space (e.g. may raise the temperature of the first space). A state parameter of an apparatus or a device for controlling whether the first space is connected with other spaces may influence the environmental parameter of the first space. For example, devices such as windows, curtains, exhaust fans, air duct systems, or the like may selectably connect the first space with the second space. An environmental parameter of the second space, such as air temperature of the second space, may influence an environmental parameter of the first space, such as air temperature of the first space. In response to an above-described device isolating the first space from the second space, the influence of the environmental parameter of the second space on the environmental parameter of the first space may be reduced or eliminated. As used herein, "selectably connects" may include a connection that may be opened or closed. The connection may be opened or closed by a user, a device, or the like or as a result from a command by a user, a device, or the like. An open connection may allow temperature, light, or another type of influence, environmental parameter, or the like to move between the connected spaces. A closed connection may prevent an influence, environmental parameter, or the like from moving between the connected spaces.

In one embodiment, the influencing parameter may include a determined environmental parameter. The determination may be based on the environmental parameter of the first space. For example, the environmental parameter of the first space may include the illumination intensity within the environment. The influencing parameter may include the illumination intensity projected into the first space from another space. In one embodiment, the influencing parameter may include the state parameter of a device for controlling whether illumination passes the device from the first space to the second space, from the second space to the first space, or the like.

Therefore, in certain embodiments, the influencing parameter may include an environmental parameter, a device parameter, or another type of parameter that may influence the environmental parameter of the first space. In some embodiments, the influencing parameter associated with the first environmental parameter may be preset according to default parameters or may be adjusted, for example, by a user, to meet certain requirements.

Step 103 includes executing a second instruction based on the influencing parameter, the first parameter value, and the second parameter value. In one embodiment, a second energy consumption in response the execution of the second instruction may be lower than the first energy consumption in response to the execution of the first instruction. For example, in one embodiment, the first electronic device may include an air conditioner. The first instruction may include a power on instruction. In response to the first instruction executing, the first electronic device may turn on, begin cooling the air of the first space, and consume power. The power consumption may be 500 watts per hour. In response to the second instruction executing, a device may aid in cooling the air of the first space, keeping the cooled air in the first space, preventing heated air from entering the first space, or the like. For example, the device may include a window and the second instruction may close the window. In response to the second instruction executing, since the window may prevent heated air from entering the first space and may keep cooled air in the first space the power consumption may be reduced, for example, to 400 watts per hour.

The second instruction may include the instruction for controlling execution of the first electronic device. The second instruction may include the instruction for controlling execution of other devices related to the influencing parameter. For example, the second instruction may power off a device in the second space. The first electronic device may include an air conditioner and the second electronic device may include a heater of the second space. The second instruction may turn off the heater to allow the air conditioner to cool the first space without the heater of the second space influencing the temperature of the first space.

In one embodiment, the method may include determining a tendency of change in the environment in the first space in the adjustment from the first parameter value to the second parameter value. The method may include determining a tendency of change in the influence of the influencing parameter on the environment of the first space. In one embodiment, in response to the tendency of change in the influence being the same as the tendency of change in the environment, the method may include determining that the influence due to the influencing parameter is a beneficial influence. In some embodiments, the second instruction for controlling the devices related to the influencing parameter may execute to increase the tendency of change in the influence or keep this influence. In one embodiment, the influence may adjust the environment of the first space toward the desired direction in which the first electronic device needs to be adjusted and controlled under the influence of a factor corresponding to the influencing parameter. In one embodiment, the adjustment may reduce the power consumption of the first electronic device.

On the other hand, in response to the tendency of change in the influence being different from the tendency of change in the environment, the method may determine that the influence due to the influencing parameter may include an adverse effect or a conflict with the adjustment and control target of the first electronic device. The second instruction for controlling the devices related to the influencing parameter may be executed to eliminate this influence from the first space or reduce this influence. Reducing or eliminating the influence may prevent the environment of the first space from being influenced by the factor corresponding to the influencing parameter. The power consumption of the first electronic device may be reduced prior to executing the second instruction.

For example, in response to the influencing parameter including an environmental parameter corresponding to other spaces and the energy consumption of the electronic device increasing under the influence of the environmental parameter, the instruction may include an instruction to isolate the space in which the electronic device is located from the other spaces to reduce the energy consumption of the electronic device. In response to the influencing parameter including an environmental parameter corresponding to other spaces that may reduce the energy consumption of the electronic device, the electronic device may execute a control instruction to enter a state of reduced energy consumption, such as off or sleeping, powered off, not executing the first instruction, or the like.

In one embodiment, the influencing parameter may include a second environmental parameter of a second space. The influencing parameter may include a device parameter of a first device. In one embodiment, the first environmental parameter may be changeable by the influence of the second environmental parameter. The first device may control the second environmental parameter to influence the first environmental parameter.

In one embodiment, an environmental parameter corresponding to other environments connected with a first environment may cause direct influence on the environmental parameter. The environmental parameter may be determined based on the environmental parameter of the first space as the influencing parameter. The influencing parameter may include a device state parameter for controlling whether the environmental parameter corresponding to other environments influences the environmental parameter of the first space. The method may include controlling various factors causing direct influence on the environmental parameter of the first space.

In some embodiments, the step of executing the second instruction may include outputting prompting information. An electronic device, such as the first electronic device, may output the prompting information. The prompting information may prompt a way to reduce the first energy consumption. The prompting information may prompt a way to lower the energy consumption to a second energy consumption that is lower than the first energy consumption after execution of the first instruction. In some embodiments, executing the second instruction may include executing the second instruction to adjust the first environmental parameter from a first parameter value to the second parameter value. The second energy consumption after execution of the second instruction may be lower than the first energy consumption after execution of the first instruction.

In one embodiment, the prompting information may be displayed on a display screen of the electronic device in a textual manner. For example, after a user turns on an air conditioner, the following information can be displayed on the display screen of the air conditioner: "Window A is currently in an open state and can be closed to improve the cooling efficiency of the air conditioner." The prompting information may include turn on an indicator light. For example, after the user turns on an air purifier, a red indicator light on the air purifier may illuminate to indicate that an exhaust fan B corresponding to this red indicator light is in an operating state and that turning off the exhaust fan B may improve the purifying efficiency of the air purifier.

The prompting information may include an alarm sound, sending a prompting message to a predetermined terminal (for example, a short message sent to the user's mobile phone), a textual form, (for example, that the air conditioner in bedroom A is in a cooling state, and the exhaust fan of bedroom A can be turned off to improve the cooling efficiency of the air conditioner) or the like. In response the user sending the instruction for turning off the exhaust fan of bedroom A through the mobile phone, the prompting information showing that the exhaust fan of bedroom A has been turned off may be displayed by this mobile phone.

In one embodiment, the step of executing the second instruction may include adjusting a device parameter of the first device. Executing the second instruction may include issuing instructions for controlling a second electronic device different from the first electronic device to adjust the device parameter. In one embodiment, adjusting the device parameter may include changing the parameter value of the second environmental parameter.

In some embodiments, the first device may include a device that controls whether other environmental parameters influence the first environmental parameter. For example, the first device may include one or more devices such as automatic doors and windows, air ducts, or the like. The first device may selectably connect the first space with the second space.

The second electronic device may include a device that controls other environmental parameters. For example, the second device may include one or more devices such as air conditioners, fan heaters, exhaust fans, or the like. In one embodiment, the second device may be located in the second space and may control the connection with the first space. The second instruction may selectably influence the first environmental parameter or control one or more above-described types of devices.

For example, in response to the first device being a door and window, the door and window may include an open state. The first device may be set in an open state. In response to the first device being in the open state, the second space may connect with the first space. The second environmental parameter corresponding to the first environmental parameter may influence the first environmental parameter. In response to the door and window being in a closed state, the second space may be isolated from the first space and the second environmental parameter may reduce the influence on the first environmental parameter.

In a further example, the second electronic device may include an exhaust fan in a second space. A user may desire to cool the first space. The exhaust fan in the second space may be set in a working state. In response to being in the working state, to the exhaust fan may control the corresponding second environmental temperature to be in a low temperature state with respect to the first environmental temperature. The power consumption of the cooling electronic device in the first space, in response to achieving the cooling target, may be reduced through the advantageous influence of simultaneous cooling of the second environmental temperature on the first environmental temperature.

In one example, the user may desire to heat the first space. The exhaust fan in the second space may be set in the off state. In response to being set in the off state, the exhaust fan may control the corresponding second environmental temperature to be in a high temperature state with respect to the first environmental temperature. The power consumption of the heating electronic device in the first space, in response to achieving the heating target, may be reduced through the advantageous influence of simultaneous heating of the second environmental temperature on the first environmental temperature.

In some embodiments, the step of adjusting the device parameter of the first device may include adjusting the device parameter of the first device to a first device parameter such the second environmental parameter influences the first environmental parameter. This adjustment may be in response to the first instruction adjusting the first parameter value to the second parameter value according to a first direction. An influencing direction of the parameter value may correspond to the first environmental parameter under the influence of the second environmental. In one embodiment, adjusting the device parameter of the first device may include adjusting the device parameter of the first device to the second device parameter to reduce the influence of the second environmental parameter on the first environmental parameter. This adjustment may be in response to the first instruction adjusting the first parameter value to the second parameter value according to the first direction. The influencing direction of the parameter value may correspond to the first environmental parameter under the influence of the second environmental parameter and may be different from the first direction.

In some embodiments, the first direction may refer to the direction of environmental change in response to adjustment of the first environmental parameter. For example, in response to adjusting the first environmental parameter from the first parameter value to the second parameter value, the environmental temperature may rises. The temperature may rise is the first direction. In a further example, in response to adjusting the first environmental parameter adjusting from the first parameter value to the second parameter value, the environmental illumination intensity may decrease The reduction of the illumination intensity may be the first direction.

In certain embodiments, the first direction may refer to the direction of change of the first environmental parameter value. For example, in response to adjusting the first environmental parameter from the first parameter value with a smaller parameter value to the second parameter value with a larger parameter value, the first direction may be the direction in which the parameter value is increased. In response to the first environmental parameter adjusting from the first parameter value with a larger parameter value to the second parameter value with a smaller parameter value, the first direction may be the direction in which the parameter value is decreased.

In one embodiment, the first direction may characterize the tendency of change in the environment in response to the adjustment of the first environmental parameter. In response to the influence of the second environmental parameter corresponding to the second space connected with the first space on the first environmental parameter being the same as the first direction, the influence of the second environmental parameter on the first environmental parameter may include an advantageous influence (e.g. an influence that adjusts an environmental parameter toward a desired target, that reduces the power consumption of a device, or the like). The influence of the second environmental parameter on the first environmental parameter may increase through adjusting the first device to enable the first space to connect with the second space.

In another embodiment, in response to the influence of the second environmental parameter corresponding to the second space connecting with the first space and the first environmental parameter being different from the first direction, the influence of the second environmental parameter on the first environmental parameter may include the adverse influence (e.g. an influence that adjusts the environmental parameter away from the desired target, that maintains or increases the energy consumption of a device, or the like). The influence of the second environmental parameter on the first environmental parameter may decrease through adjusting the first device to enable the first space to be isolated from the second space.

For example, in response to the first device being a door and window that selectably connects the first space and the second space, the first environmental parameter is the temperature parameter, the second parameter value is larger than the first parameter value, and the first environmental temperature is increased under the influence of the second environmental temperature, it indicates that the influence of the second environmental parameter on the first environmental parameter is the advantageous influence. The first device may adjust to be in an open state for enabling the connection between the first space and the second space. The second environmental temperature may influence the first environmental temperature increase the influence. In response to reducing the first environmental temperature through the influence of the second environmental temperature, the influence of the second environmental parameter on the first environmental parameter may include the adverse influence. The first device may adjust to be in a closed state to isolate the first space from the second space. The influence of the second environmental temperature on the first environmental temperature may decrease or be eliminated.

In one example, the first device may include a door and window. The door and window may connect the first space and the second space. The first environmental parameter may include an illumination intensity parameter. The second parameter value may be smaller than the first parameter value. In response to the first environmental illumination increasing under the influence of the second environmental illumination, the influence of the second environmental parameter on the first environmental parameter may be an adverse influence. The door and window may adjust to be in a closed state to isolate the first space from the second space. In response to the isolation, the illumination in the second space may not be projected into the first space through the first device. The influence of the second environmental illumination on the first environmental illumination may be reduced. In one embodiment, the door and window maybe in an open state to connect the first space and the second space. The second environmental illumination influence the first environmental illumination may increase.

In some embodiments, the step of issuing instructions for controlling the second electronic device different from the first electronic device to adjust the device parameter may include, in response the first instruction adjusting the first parameter value to the second parameter value according to the second direction, issuing instructions for controlling the adjustment of the first electronic device to a third device parameter. In some embodiments, the adjusting direction of the parameter value corresponding to the first environmental parameter under the influence of the second environmental parameter after the change may include the second direction.

In one embodiment, the parameter value corresponding to the second environmental parameter may adjust through adjusting the device parameter of the second electronic device. The influence of the second environmental parameter on the first environmental parameter may include the advantageous influence. In response, the power consumption of the first electronic device may decrease.

For example, the second electronic device may include a small-sized air purifier disposed in the second space. In response to the first environmental parameter being the air quality parameter, the small-sized air purifier may be in an operating state. The air quality parameter in the second space may be lower than the air quality parameter in the first space. The air quality in the second space may be simultaneously purified to reduce the load of the electronic device in the first space, improve the purifying efficiency, and reduce the air purifying power consumption of the electronic device. One or more of these results may occur at substantially the same time of completing the purifying target. In one embodiment, the air quality parameter in the second space may be higher than the air quality parameter in the first space. The small-sized air purifier may be in a low power consumption state. The air in the second space may be purified slowly or may not need purification treatment to reach a desired air quality. In response, the load of the electronic device in the first space may be reduced, and the air purification power consumption of the electronic device may decrease. The power consumption may decrease at substantially the same time as completing the purifying target.

In one example, the second electronic device may include a small-sized humidifier-dehumidifier disposed in the second space. The first environmental parameter may include the environmental humidity parameter. The second parameter value may be larger than the first parameter value. The first environmental humidity may decrease under the influence of the second environmental humidity. The influence of the second environmental parameter on the first environmental parameter may include the adverse influence. The small-sized humidifier-dehumidifier may be set to a humidification state. The environmental humidity in the second space may be higher than that in the first space. In response, the humidifying load of the first electronic device in the first space may decrease, which may improve the humidifying efficiency and reduce the humidifying power consumption. These results may occur at substantially the same time of completing the humidifying target. In response to increasing the first environmental humidity under the influence of the second environmental humidity, the influence of the second environmental parameter on the first environmental parameter may be the advantageous influence. The small-sized humidifier-dehumidifier may be in the humidification state. The environmental humidity in the second space may be higher than that in the first space. In response, the humidifying load of the first electronic device in the first space may decrease and improve the humidifying efficiency, and reduce the humidifying power consumption. These results may occur at substantially the same time of completing the humidifying target.

In one embodiment, the step of executing the second instruction may include executing an instruction of reducing power consumption to operate electronic device in a low power consumption state.

In one embodiment, in response to executing the second instruction, the power consumption of the first electronic device may decrease through a variety of ways described above. The first electronic device in the first space may be simultaneously adjusted to a state of reducing power consumption (such as a sleeping state, an off state, or a state of not executing the first instruction, or the like), thereby the first environmental parameter can achieve the parameter adjustment target under the influence of the second environmental parameter.

Figure 2:
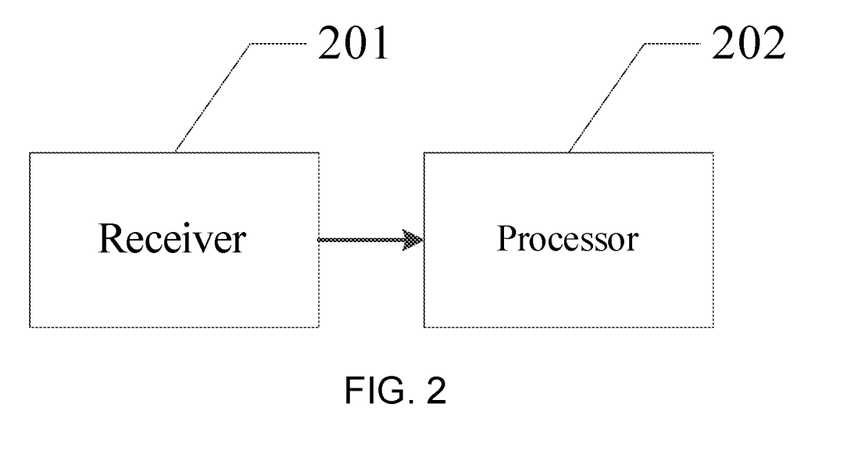
FIG. 2 is a structure diagram of an electronic device provided by an embodiment of the present disclosure.

FIG. 2 depicts one embodiment of an electronic device. In one embodiment, the electronic device may include a receiver 201 to obtain a first instruction. The first instruction may adjust a first environmental parameter of the first space from a first parameter value to a second parameter value. The electronic device may include a processor 202 to obtain an influencing parameter and execute the second instruction based on the influencing parameter, the first parameter value, or the second parameter value. The environmental parameter of the first space may be changeable by the influence of the influencing parameter. The second energy consumption in response to execution of the second instruction may be lower than the first energy consumption in response to execution of the first instruction.

In one embodiment, the processor 202 may include a central processing unit (CPU), an application specific integrated circuit (ASIC), or one or more integrated circuits used for controlling program execution, or the like. In some embodiments, the electronic device may include one or more memories. The memory may include a read only memory (ROM), a random access memory (RAM), a magnetic disk memory, or the like.

In one embodiment, the influencing parameter may include a second environmental parameter of a second space and/or a device parameter of a first device. The first environmental parameter may be changeable by the influence of the second environmental parameter. The first device may control the second environmental parameter to influence the first environmental parameter.

In one embodiment, the electronic device may include an outputter to output prompting information. The prompting information may prompt a way for reducing the first energy consumption. A second energy consumption of the electronic device may be lower than a first energy consumption in response to execution of the first instruction. In one embodiment, the processor 202 may execute the second instruction. In response to the processor 202 executing the first instruction, the first environmental parameter may adjust from the first parameter value to the second parameter value. The second energy consumption, in response to execution of the second instruction, may be lower than the first energy consumption in response to execution of the first instruction.

In one embodiment, the processor 202 may adjust the device parameter of the first device. The processor 202 may issue one or more instructions for controlling the second electronic device different from the first electronic device to adjust a device parameter. In response, the parameter value of the second environmental parameter may change.

In some embodiments, the processor 202 may adjust the device parameter of the first device to the first device parameter in response to the first instruction adjusting the first parameter value to the second parameter value according to a first direction. The influencing direction of the parameter value may correspond to the first environmental parameter under the influence of the second environmental parameter. The influencing direction may include the first direction. The influencing direction may influence the first environmental parameter by using the second environmental parameter. In one embodiment, the processor 202 may adjust the device parameter of the first device to the second device parameter in response to the first instruction adjusting the first parameter value to the second parameter value according to the first direction. The influencing direction of the parameter value corresponding to the first environmental parameter under the influence of the second environmental parameter may be different from the first direction. The influencing direction may reduce the influence of the second environmental parameter on the first environmental parameter.

In one embodiment, the processor 202 may issue one or more instructions to control the adjustment of the second electronic device to a third device parameter in response to the first instruction adjusting the first parameter value to the second parameter value according to the second direction. The adjusting direction of the parameter value corresponding to the first environmental parameter under the influence of the second environmental parameter in response to the change may include the second direction.

In some embodiments, the processor 202 may execute an instruction to reduce power consumption in response to adjusting the device parameter of the first device to a first device parameter. In response to executing the instruction, the electronic device may operate in a low power consumption state.

Figure 3:
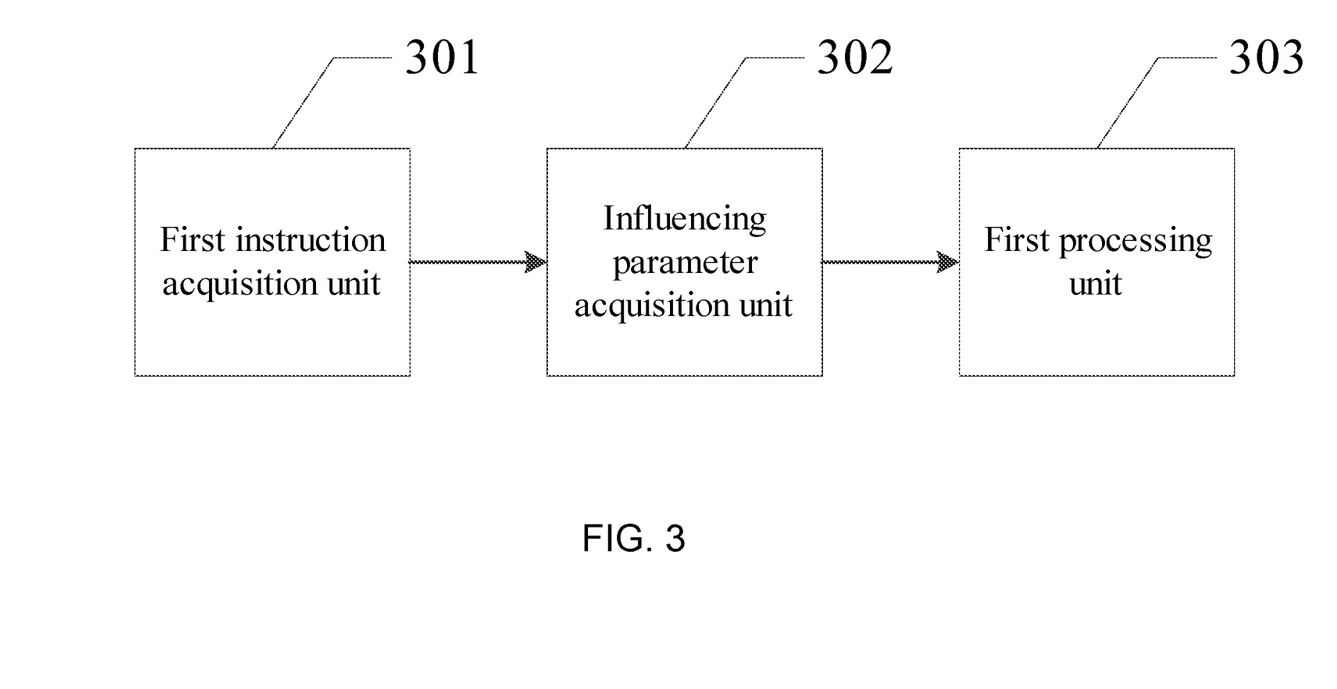
FIG. 3 is a structure diagram of an electronic apparatus provided by an embodiment of the present disclosure.

Various variations and specific examples of the control method in the foregoing embodiments of FIG. 1 are also applicable to the electronic device. From the foregoing detailed descriptions of the control method, a person skilled in the art may understand the implementation method of the electronic device, and thus, detailed descriptions are not repetitively provided herein. FIG. 3 depicts one embodiment of an electronic apparatus. The apparatus may include a first instruction acquisition unit 301 to obtain a first instruction. The first instruction may adjust a first environmental parameter of a first space from a first parameter value to a second parameter value. The apparatus may include an influencing parameter acquisition unit 302 to obtain an influencing parameter. The environmental parameter of the first space may be changeable by the influence of the influencing parameter. The apparatus may include a first processing unit 303 to execute a second instruction based on the influencing parameter, the first parameter value, or the second parameter value. The second energy consumption may decrease in response to execution of the second instruction. The second energy consumption may be lower than the first energy consumption.

In some embodiments, the influencing parameter may include a second environmental parameter of a second space and/or a device parameter of a first device. The first environmental parameter may be changeable by the influence of the second environmental parameter. The first device may control the second environmental parameter to influence the first environmental parameter.

In certain embodiments, the first processing unit 303 may include a prompting information output unit to output prompting information. The prompting information may prompt a way for reducing the first energy consumption. The second energy consumption may be lower than the first energy consumption. The first processing unit 303 may include a second processing unit to execute the second instruction. In response to the second instruction, the first environmental parameter may adjust from the first parameter value to the second parameter value. The second energy consumption in response to execution of the second instruction may be lower than the first energy consumption.

In one embodiment, the second processing unit may include a first device processing unit to adjust a device parameter of the first device. The second processing unit may include a second device processing unit to issue instructions to control the second electronic device different from the first electronic device to adjust the device parameter. In response to controlling the second electronic device, the parameter value of the second environmental parameter may change.

In one embodiment, the first device processing unit may include a first state adjustment unit to adjust the device parameter of the first device to the first device parameter in response to the first instruction adjusting the first parameter value to the second parameter value according to the first direction. The influencing direction of the parameter value may correspond to the first environmental parameter under the influence of the second environmental parameter. The influencing direction may include the first direction. The influencing direction may influence the first environmental parameter by using the second environmental parameter. In one embodiment, the first device processing unit may include a second state adjustment unit to adjust the device parameter of the first device to the second device parameter in response to the first instruction adjusting the first parameter value to the second parameter value according to the first direction. The influencing direction of the parameter value may correspond to the first environmental parameter under the influence of the second environmental parameter. The influencing direction may be different from the first direction. The influencing direction may reduce the influence of the second environmental parameter on the first environmental parameter.

In some embodiments, the second device processing unit may include an environmental adjustment unit to issue instructions for controlling the adjustment of the second electronic device to a third device parameter in response to the first instruction adjusting the first parameter value to the second parameter value according to a second direction. The adjusting direction of the parameter value may corresponding to the first environmental parameter under the influence of the second environmental parameter in response to the change being the second direction.

In one embodiment, the second processing unit may include a third processing unit used for executing an instruction to reduce power consumption. In response to executing the instruction, the first electronic device may operate in a low power consumption state.

Various variations and specific examples of the control method in the foregoing embodiments in FIG. 1 are also applicable to the embodiments of the electronic apparatus. From the foregoing detailed descriptions of the embodiments of the control method, a person skilled in the art may understand the implementation method of the electronic apparatus, and thus for brevity of the specification, detailed descriptions are not repetitively provided herein.

A person skilled in the art may understand that the embodiments of the present application may be provided as a method, system, or computer program product. Accordingly, the present application may adopt the form of entire hardware embodiment, entire software embodiment, or combination of software and hardware embodiments. Moreover, the present application may employ the form of a computer program product that is implemented on one or more computer-usable storage media (including, but not limited to, a disk memory, a CD-ROM, an optical memory, or the like) having computer-usable program code therein. The computer program product may include a non-transitory computer-readable medium. The medium may include executable code stored on the medium. A processor may execute one or more pieces of code of the executable code.

The present application is described with reference to a flow chart and/or block diagram of the method, device, system, or computer program product according to the embodiments of the present application. It should be understood that computer program instructions may be used to implement each flow and/or block in the flow diagrams and/or block diagrams and combinations of flow and/or block in the flow diagrams and/or block diagrams. These computer program instructions may be provided to a generic computer, a dedicated computer, an embedded processor, or other programmable data processing devices to generate a machine. The instructions, which execute via the processor of the computer or other programmable data processing devices, may create the implementation of the functions specified in one or more flows of the flow diagram and/or one or more blocks of the block diagram.

These computer program instructions may be stored in a computer readable memory that may direct a computer or other programmable data processing devices to function in a particular manner. The instructions stored in the computer readable memory may produce an article of manufacture including instructions implementing the functions specified in one or more flows of the flow diagram and/or one or more blocks of the block diagram.

These computer program instructions may be loaded onto a computer or other programmable data processing devices to cause a series of operational steps to be performed on the computer or other programmable devices to produce a computer implemented process. The instructions that are executed on the computer or other programmable devices may provide steps for implementing the functions specified in one or more flows of the flow diagram and/or one or more blocks of the block diagram.

In some embodiments, the computer program instructions that correspond to a display method in the embodiments of the present application may be stored in storage media, such as an optical disk, a hard disk, a U-disk, or the like. In response to the computer program instructions that correspond to a control method in the storage media being read or executed by an electronic device, the instruction may execute, carry out, or the like steps, instructions, or the like described above in relation to the methods, electronic devices, apparatuses, or computer program products described above in relation to FIGS. 1-3.

Although certain embodiments of the present application have been described, a person skilled in the art may make additional changes and modifications to these embodiments upon learning the basic inventive concepts. Therefore, the following claims are intended to be construed as to cover the described embodiments and all changes and modifications falling within the scope of this application.

It is apparent that, persons skilled in the art may make various alterations and variations to the present application without departing from the spirit and scope of the present application. Therefore, the present application is intended to cover these alterations and variations provided that such modifications and variations made to the present application fall within the scope of the claims of the present application and their equivalent technologies.

What is claimed is:

1. A method comprising:
   executing, on a first device, a first instruction for adjusting a first environmental parameter of a first space from a first parameter value to a second parameter value;
   determining an influencing parameter, wherein the influencing parameter influences a change in the first environmental parameter of the first space and wherein the influencing parameter comprises a parameter selected from the group consisting of a second environmental parameter of a second space that influences a change in the first environmental parameter, and a device parameter of a first device that controls the second environmental parameter; and
   executing a second instruction based on at least one of the influencing parameter, the first parameter value, and the second parameter value, wherein a second energy consumption of the first device, in response to execution of the second instruction, is lower than a first energy consumption of the first device in response to execution of the first instruction.

2. The method of claim 1, wherein the first environmental parameter comprises a parameter selected from the group consisting of: an illumination level; a temperature; an air quality; and a humidity.

3. The method of claim 2, wherein executing the second instruction comprises:
   outputting prompting information comprising one or more prompted instructions for reducing the first energy consumption; and
   in response to executing at least one of the one or more prompting instructions, the second energy consumption is lower than the first energy consumption.

4. The method of claim 3, wherein executing the second instruction comprises:
   adjusting the device parameter of the first device; and
   generating one or more instructions that control a second device to adjust the device parameter, wherein, in response to adjusting the device parameter, a parameter value of the second environmental parameter changes.

5. The method of claim 4, wherein adjusting the device parameter of the first device comprises:
   in response to the first instruction adjusting the first parameter value to the second parameter value in a first direction and an influencing direction of a second influencing parameter influences the first environmental parameter comprises the first direction, adjusting the device parameter of the first device to a first device parameter to cause the second environmental parameter to influence the first environmental parameter; and
   in response to the first instruction adjusting the first parameter value to the second parameter value in the first direction and the influencing direction of the second influencing parameter influences the first environmental parameter comprises a different direction from the first direction, adjusting the device parameter of the first device to a second device parameter to reduce the influence of the second environmental parameter on the first environmental parameter.

6. The method of claim 5, wherein generating one or more instructions that control the second electronic device different from the first electronic device to adjust the device parameter comprises: generating one or more instructions that adjust the second electronic device to a third device parameter in response to the first instruction adjusting the first parameter value to the second parameter value in a second direction, wherein an adjusting direction of the parameter value of the first environmental parameter comprises the second direction.

7. The method of claim 4, wherein executing the second instruction comprises executing a power-reduction instruction that operates the first electronic device in a low power consumption state.

8. An electronic device, comprising:
a receiver that executes a first instruction that adjusts a first environmental parameter of a first space from a first parameter value to a second parameter value; and
a processor that
determines an influencing parameter, wherein the influencing parameter influences a change in the first environmental parameter of the first space, and wherein the influencing parameter comprises a parameter selected from the group consisting of a second environmental parameter of a second space that influences a change in the first environmental parameter, and a device parameter of a first device that controls the second environmental parameter, and
executes a second instruction based on the influencing parameter, the first parameter value, and the second parameter value, wherein a second energy consumption in response to the execution of the second instruction is lower than a first energy consumption in response to the execution of the first instruction.

9. The electronic device of claim 8, wherein the first environmental parameter is a parameter selected from the group consisting of: an illumination level; a temperature; an air quality; and a humidity.

10. The electronic device of claim 9, wherein the electronic device further comprises:
an outputter that outputs prompting information comprising one or more prompted instructions for reducing the first energy consumption; and
and wherein the second energy consumption is lower than the first energy consumption in response to the processor executing at least one of the one or more prompting instructions.

11. The electronic device of claim 10, wherein the processor executing the second instruction comprises:
adjusts the device parameter of the first device; and
generates one or more instructions that control a second device to adjust the device parameter, wherein, in response to adjusting the device parameter, a parameter value of the second environmental parameter changes.

12. The electronic device of claim 11, wherein the processor adjusting the device parameter of the first device comprises:
in response to the first instruction adjusting the first parameter value to the second parameter value in a first direction and an influencing direction of a second influencing parameter influences the first environmental parameter comprising the first direction, the processor adjusts the device parameter of the first device to a first device parameter to cause the second environmental parameter to influence the first environmental parameter; and
in response to the first instruction adjusting the first parameter value to the second parameter value in the first direction and the influencing direction of the second influencing parameter influences the first environmental parameter comprises a different direction from the first direction, the processor adjusts the device parameter of the first device to a second device parameter to reduce the influence of the second environmental parameter on the first environmental parameter.

13. The electronic device of claim 12, wherein the processor generating one or more instructions that control the second electronic device different from the first electronic device to adjust the device parameter comprises:
the processor generating one or more instructions that adjust the second electronic device to a third device parameter in response to the first instruction adjusting the first parameter value to the second parameter value in a second direction, wherein an adjusting direction of the parameter value of the first environmental parameter comprises the second direction.

14. The electronic device of claim 11, wherein the processor executing the second instruction further comprises the processor executing a power-reduction instruction that operates the first electronic device in a low power consumption state.

15. The electronic apparatus of claim 8 further comprising:
a first instruction acquisition unit that obtains the first instruction, wherein the first instruction adjusts the first environmental parameter of the first space from the first parameter value to the second parameter value; and
an influencing parameter acquisition unit that obtains the influencing parameter, wherein the influencing parameter changes the environmental parameter,
where the processors executes the second instruction based on the influencing parameter, the first parameter value and the second parameter value, wherein the second energy consumption is lower in response to the execution of the second instruction than the first energy consumption in response to the execution of the first instruction.

16. A program product comprising a non-transitory computer readable storage medium that stores code executable by a processor, the executable code comprising code to perform:
executing, on a first device, a first instruction for adjusting a first environmental parameter of a first space from a first parameter value to a second parameter value;
determining an influencing parameter, wherein the influencing parameter influences a change in the first environmental parameter of the first space and wherein the influencing parameter comprises a parameter selected from the group consisting of a second environmental parameter of a second space that influences a change in the first environmental parameter, and a device parameter of a first device that controls the second environmental parameter; and
executing a second instruction based on at least one of the influencing parameter, the first parameter value, and the second parameter value, wherein a second energy consumption of the first device, in response to execution of the second instruction, is lower than a first energy consumption of the first device in response to execution of the first instruction.

17. The programming product of claim 16, wherein the executable code to perform executing the second instruction comprises code to perform:
outputting prompting information comprising one or more prompted instructions for reducing the first energy consumption; and
wherein, in response to executing at least one of the one or more prompting instructions, the second energy consumption is lower than the first energy consumption.

18. The programming product of claim 17, wherein the executable code further comprises code executable to perform:
   adjusting the device parameter of the first device; and
   generating one or more instructions that control a second device to adjust the device parameter, wherein, in response to adjusting the device parameter, a parameter value of the second environmental parameter changes.

19. The programming product of claim 18, wherein the executable code further comprises a power-reduction instruction that operates the first electronic device in a low power consumption state.

20. The programming product of claim 16, wherein the first environmental parameter comprises a parameter selected from the group consisting of: an illumination level; a temperature; an air quality; and a humidity.

* * * * *